United States Patent
Sun et al.

(10) Patent No.: US 12,229,095 B2
(45) Date of Patent: Feb. 18, 2025

(54) HYBRID QUERY AND INDEX FOR HIGH PERFORMANCE IN A CLOUD

(71) Applicant: INTERNATIONAL BUSINESS MACHINES CORPORATION, Armonk, NY (US)

(72) Inventors: Sheng Yan Sun, Beijing (CN); Peng Hui Jiang, Beijing (CN); Xiao Xiao Chen, Beijing (CN); Ying Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 18/091,570

(22) Filed: Dec. 30, 2022

(65) Prior Publication Data

US 2024/0220465 A1 Jul. 4, 2024

(51) Int. Cl.
| | |
|---|---|
| *G06F 16/00* | (2019.01) |
| *G06F 16/22* | (2019.01) |
| *G06F 16/242* | (2019.01) |
| *G06F 16/2457* | (2019.01) |
| *G06F 18/2323* | (2023.01) |

(52) U.S. Cl.
CPC .......... *G06F 16/22* (2019.01); *G06F 16/2425* (2019.01); *G06F 16/24578* (2019.01); *G06F 18/2323* (2023.01)

(58) Field of Classification Search
None
See application file for complete search history.

(56) References Cited

U.S. PATENT DOCUMENTS

| | | | |
|---|---|---|---|
| 9,098,584 B1* | 8/2015 | Fredinburg | G06F 16/951 |
| 11,068,460 B2* | 7/2021 | Zait | G06F 16/213 |
| 11,321,329 B1* | 5/2022 | Shih | G06F 16/2272 |
| 11,580,126 B1* | 2/2023 | Sultania | G06F 16/334 |
| 11,836,146 B1* | 12/2023 | Pathak | H04L 43/04 |
| 2010/0257151 A1* | 10/2010 | Lohman | G06F 16/2228 707/715 |
| 2015/0227561 A1* | 8/2015 | Bender | G06F 16/2246 707/602 |

(Continued)

FOREIGN PATENT DOCUMENTS

| | | |
|---|---|---|
| CN | 113407801 | 9/2021 |
| WO | 2022140020 | 6/2022 |

*Primary Examiner* — Hasanul Mobin
(74) *Attorney, Agent, or Firm* — Lilly Neff; Andrew D. Wright; Calderon Safran & Wright P.C.

(57) ABSTRACT

A computer-implemented method, including receiving, by a processor set, a query including a query string for a system catalog; identifying, by the processor set, a default index structure of the system catalog; executing, by the processor set, the query based on the default index structure of each index in the system catalog; ranking, by the processor set, a performance of each execution of the query by each index; mapping, by the processor set, a query pattern to a corresponding index of the system catalog; selecting, by the processor set, the index to perform the query using a machine learning (ML) model trained with a knowledge base that includes the ranking and the mapping; executing, by the processor set, the query on the selected index; and in response to executing the query on the selected index, returning, by the processor set, a result of the query.

20 Claims, 8 Drawing Sheets

(56) References Cited

U.S. PATENT DOCUMENTS

| | | | |
|---|---|---|---|
| 2016/0196349 A1* | 7/2016 | Berkhin | G06F 16/29 |
| | | | 707/706 |
| 2017/0116253 A1* | 4/2017 | Eadon | G06F 16/2453 |
| 2017/0163611 A1 | 6/2017 | Cooley | |
| 2018/0314744 A1 | 11/2018 | Mathew | |
| 2019/0012381 A1* | 1/2019 | Debique | G06F 16/9535 |
| 2019/0197175 A1* | 6/2019 | Purcell | G06F 16/2453 |
| 2019/0251195 A1* | 8/2019 | Purcell | G06F 16/24542 |
| 2020/0327134 A1* | 10/2020 | Freed | G06F 16/288 |
| 2021/0157845 A1* | 5/2021 | Dodel | G06N 3/08 |
| 2023/0016157 A1* | 1/2023 | Ferreira Moreno | |
| | | | G06F 16/24578 |
| 2024/0220465 A1* | 7/2024 | Sun | G06F 16/24578 |

\* cited by examiner

HYBRID QUERY AND INDEX FOR HIGH PERFORMANCE IN A CLOUD

BACKGROUND

Aspects of the present invention relate generally to database information management and, more particularly, to database query and index usage for high performance in a cloud. Efficient database information management is important to database systems since queries for data from managed databases may be received at extremely high volumes. When queries are at such high volumes, performance losses from these queries may be compounded exponentially. Further, as cloud computing services become more diverse, such as in hybrid cloud computing, and higher speeds are necessary, efficient querying of these hybrid cloud computing services is necessary to maintain these higher speeds. Hybrid cloud computing services may include multiple indexes built in different database types (e.g., SQL and NoSQL databases). Queries may often specify which database type and/or particular index the query is attempting to search.

SUMMARY

In a first aspect of the invention, there is a computer-implemented method including: receiving, by a processor set, a query including a query string for a system catalog; identifying, by the processor set, a default index structure of the system catalog; executing, by the processor set, the query based on the default index structure of each index in the system catalog; ranking, by the processor set, a performance of each execution of the query by each index; mapping, by the processor set, a query pattern to a corresponding index of the system catalog; selecting, by the processor set, the index to perform the query using a machine learning (ML) model trained with a knowledge base that includes the ranking and the mapping; executing, by the processor set, the query on the selected index; and in response to executing the query on the selected index, returning, by the processor set, a result of the query.

In another aspect of the invention, there is a computer program product including one or more computer readable storage media having program instructions collectively stored on the one or more computer readable storage media. The program instructions are executable to: receive a query including a query string for a system catalog; determine the query string includes a specified index; monitor the specified index for activity; identify a default index structure of the system catalog based on the activity; execute the query based on the default index structure of each index in the system catalog; rank a performance of each execution of the query by each index; map a query pattern to a corresponding index of the system catalog; select the index to perform the query using a machine learning (ML) model trained with a knowledge base that includes the ranking and the mapping; execute the query on the selected index; and in response to the execution of the query on the selected index, return a result of the query.

In another aspect of the invention, there is system including a processor set, one or more computer readable storage media, and program instructions collectively stored on the one or more computer readable storage media, the program instructions executable to receive a query including a query string for a system catalog; determine the query string includes a specified index; monitor the specified index for activity; identify a default index structure of the system catalog based on the activity; execute the query on each index in the system catalog; rank a performance of each execution of the query by each index; map a query pattern to a corresponding index of the system catalog; select the index to perform the query using a machine learning (ML) model trained with a knowledge base that includes the ranking and the mapping; execute the query on the selected index; and in response to the execution of the query on the selected index, return a result of the query.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
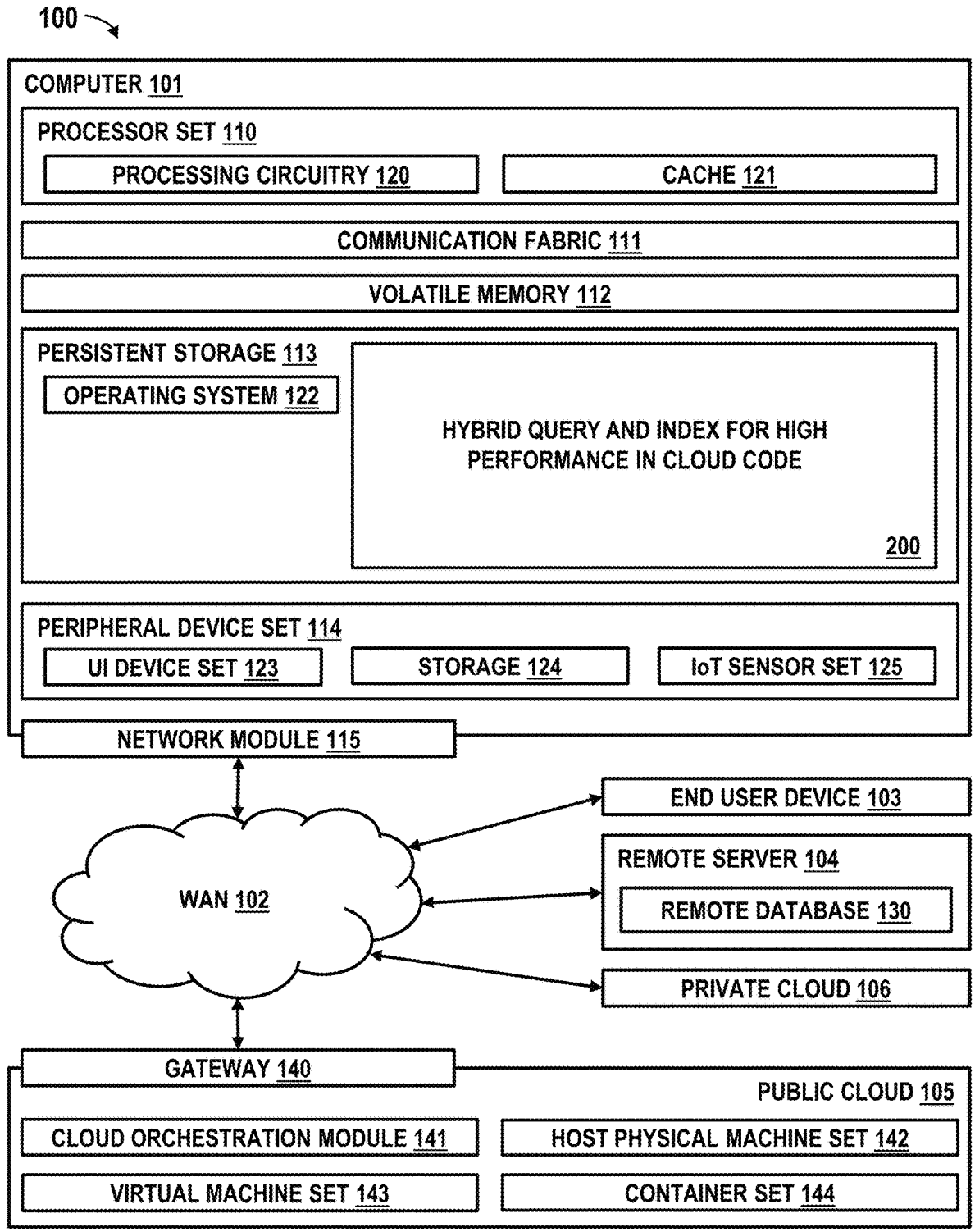
FIG. 1 depicts a computing environment, according to an embodiment of the present invention.

Aspects of the present invention relate generally to querying databases in a hybrid cloud computing system, more particularly, to hybrid querying and indexing for high performance on a cloud. In embodiments, a computing device uses machine learning (ML) modeling based on clustering for detecting relationships between queries and the execution of the queries by the indexes and databases in the system. In this manner, implementations of the invention provide a method of best determining which index/database will meet the needs of the query most efficiently.

In aspects of the invention, there is a method and system for analyzing database index usage and query execution performance patterns for creating a new index in a hybrid/mixed cloud environment to enhance query performance. In embodiments, the method includes: analyzing a system catalog to monitor database activities specified in a query string/statement and identifying a default index structure; converting the query string/statements to a normalized query pattern; generating, on-demand, new invisible indexes based on the query pattern; iterating the query pattern and performing the query in the background for each index; building a baseline and ranking the performance of each index by creating a mapping relationship between the query pattern and existing and/or invisible indexes; enabling a hybrid database to separately apply new visible indexes on demand; accepting new incoming query statements, selecting the new visible index with the best performance to perform the query; and giving feedback query results to a third-party query tuning system.

Improvements in query performance by conventional systems are generally inefficient and/or apply only to particular queries as needed and specified. In fact, the specified database type and/or index may not be the most efficient database to execute the query. Thus, a technical problem with cloud size increases is that these inefficiencies compound themselves and require more and more resources to improve performance to querying and/or do not have their own particular improvements (e.g., due to the diversity in types of indexes, databases, and queries). For example, as a hybrid cloud size is expanded, different index and database types are used, thus, a query may not be appropriate for every index. Embodiments of the invention provide a technical solution to this problem by analyzing the structure of a cloud system catalog and determining relationships between queries and the indexes used to respond to a query. This determination and analysis provide a basis for determining the index/index type that may fulfill particular types of queries in the most efficient manner. In particular, the hybrid query and index server may categorize the queries and indexes into a knowledge base to make the determination of which index would fulfill the query in the most efficient manner. In this manner, implementations of the invention provide a technical improvement to database query and index usage for high performance in a cloud system.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as hybrid query and index for high performance in cloud code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip."

In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer

101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
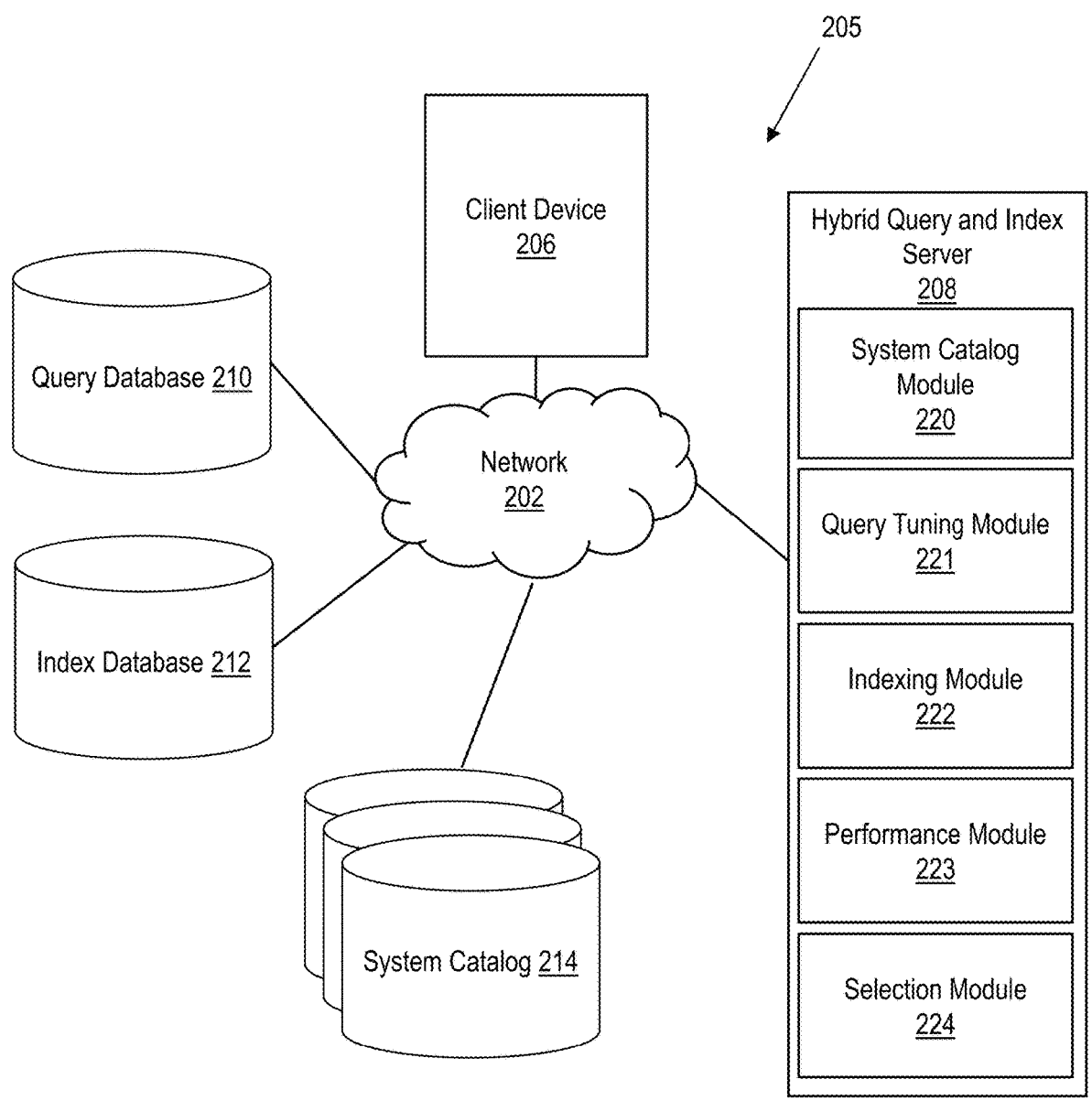
FIG. 2 shows a block diagram of an exemplary environment, according to an embodiment of the present invention.

FIG. 2 shows a block diagram of an exemplary environment 205, in accordance with aspects of the invention. In embodiments, the environment 205 includes a network 202 enabling communication between client device 206, hybrid query and index server 208, query database 210, index database 212, and system catalog 214. In one example, the client device 206 and hybrid query and index server 208 of FIG. 2 may correspond to respective instances of the computer 101 of FIG. 1. In another example, the client device 206 may correspond to an end user device 103 of FIG. 1 that runs an application, and the hybrid query and index server 208 may correspond to the computer 101 of FIG. 1.

In one example, the query database 210, index database 212, and system catalog 214 of FIG. 2 may correspond to one or more instances of the remote database 130 of FIG. 1. In another example, the query database 210, index database 212, and system catalog database 214 may correspond to one or more instances of the storage 124 of FIG. 1. In embodiments, the query database 210, index database 212, and system catalog 214 may correspond to other storage locations on one or more of the computer 101, end user device 103, or a remote server 104 of FIG. 1. In embodiments, network 202 of FIG. 2 may correspond to WAN 102 of FIG. 1.

In embodiments, the hybrid query and index server 208 of FIG. 2 comprises a system catalog module 220, a query tuning module 221, an indexing module 222, a performance module 223, and a selection module 224, each of which may comprise modules of the code of block 200 of FIG. 1. These modules of the code of block 200 are executable by the processing circuitry 120 of FIG. 1 to perform the inventive methods as described herein. The hybrid query and index server 208 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In embodiments, the system catalog module 220 is configured to analyze a system catalog 214, monitor database activities, and identify default index structures of the system catalog 214. The system catalog data may include information about the index structures, database activities, and index performance statistics that may be stored and managed in index database 212. In embodiments, the collected system catalog data may be used to determine related data distribution. In exemplary embodiments, an optimizer (not shown) is used to identify the basic length for each record in a database. In exemplary embodiments, the system catalog module 220 monitors database activities (and subsequently index activities) to track and determine performance statistics. In exemplary embodiments, the object types of data in the databases may determine the particular types of statistics collected. For example, as shown in Table 1 below, the object types include particular types of statistics.

TABLE 1

Index Statistics Types by Object Types

| Object Type | Statistics | |
|---|---|---|
| Table | Cardinality | |
| Single Column | Cardinality | |
| | Low2key | |
| | High2key | |
| | Frequency | |
| | Histogram (each quantile) | Cardinality |
| | | Low2key |
| | | High2key |
| | | Frequency |
| Multi-Column | Single Column Statistics | |
| | Multi-Cardinality | |
| | Multi-Column Frequency | |
| Partition Table | Single Column Statistics | |
| | Partition Key (each partition) | Cardinality |
| | | Low2key |
| | | High2key |
| | | Frequency |

In Table 1, each of the object types include many different statistics types; thus, each object type may utilize one or more of these statistic types to track index performance. In this example, Cardinality represents the number of elements in the table, single column, histogram of the single column, and/or partition key of each partition of the partition table. In this example, Low2key represents the second lowest values in a single column and/or partition key of each partition of the partition table. In this example, High2key represents the second highest values in a single column and/or partition key of each partition of the partition table. In this example, Frequency represents the number of times a specific data value occurs in a database for a histogram of each quantile of a single column and/or partition key of each partition of the partition table.

In exemplary embodiments, the system catalog module 220 also monitors database activities (and subsequently index activities) to identify a default index structure. Indexes with various default index structures will only allow certain types of activity, for example, bidirectional indexes will allow scans in forward and reverse directions, and secondary indexes will have multiple columns. The activity of these indexes can thus be used to determine the default index structure. Identifying the default index structure provides more efficient and effective searches of those indexes. For example, a bidirectional index may allow a query to do a search in both the forward and reverse directions, even if the received query does not include this functionality in the query statement. Additionally, identifying the default index structure may provide a baseline for the index and be used to determine the efficiency of querying the specified index with particular queries. For example, particular index types may be compared to one another to determine which of these particular index types provided the best performance with particular queries and/or query patterns.

In exemplary embodiments, the system catalog module 220 also tracks and monitors hot spots of a data page of the databases. The hot spots may include frequently accessed data from the data pages. The system catalog module 220 may also maintain indexes of the database during idle times such as when no queries are being requested from the database.

In embodiments, the query tuning module 221 is configured to identify query patterns based on the query string and subsequently the query statement. In embodiments, the query tuning module 221 may analyze the incoming query using a query analyzer. In exemplary embodiments, the query analyzer identifies indexes or databases that are specified in the query. Subsequently, the identified indexes or databases may be monitored by the system catalog module 220. In embodiments, the query tuning module 221 may analyze a query pattern using a query pattern analyzer. In exemplary embodiments, data associated with the analyzed query pattern is stored and managed in a knowledge base. For example, the knowledge base may be created from collected historical query performances and/or results of a query tuning ML model. In another example, the knowledge base may include the query structure and index performance statistics. The query pattern may be converted among a plurality of index types. In exemplary embodiments, the query tuning module 221 may also be used to normalize query patterns for different types of indexes. The performance of each of these query patterns on the index may be measured.

In exemplary embodiments, the query tuning module 221 determines the query pattern based on query structure (from the query analyzer) and index performance statistics. In exemplary embodiments, the knowledge base includes a knowledge map based on rules to determine the query pattern and relationship between the index performance statistics and query pattern. In exemplary embodiments, the knowledge map in the knowledge base is built from a trained clustering ML model that determines the query pattern and relationship between index performance statistics and query pattern. In exemplary embodiments, multi-tenant clusters are analyzed and used to train the clustering ML model. The multi-tenant clusters may place the data and nodes of indexes in different clusters to isolate and separate performance statistics of those indexes. Based on the isolated performance statistics, the query pattern and relationship between the query and the index is mapped. Thereby, index performance may be associated with the executed query pattern. In exemplary embodiments, the rules may include parts of a query pattern and their application to a particular index or index type, the index performance statistics, and what these index performance statistics indicate when the query is executed on the index.

In embodiments, the indexing module 222 builds a new invisible index when a new query is received. The new query is analyzed to determine a query pattern and the new index is built to determine whether a new index would perform better than the default system catalog databases. In embodiments, the indexing module 222 determines the visibility of indexes in the system catalog 214. The visibility of the indexes may be determined by performance benchmarking of the indexes and comparing the index performances for each query pattern. For example, Table 2 includes an index performance knowledge base showing the performance of each index for each query pattern under different contexts.

TABLE 2

Index Performance Knowledge Base

| Query Pattern | Query Context | Index Type | Used Frequency | Performance Benchmark | Recommendation Ratio |
|---|---|---|---|---|---|
| Query Pattern A | Context A | Index Type A | 55% | 80% | 70% |
| Query Pattern A | Context A | Index Type B | 35% | 7% | 18% |
| Query Pattern A | Context A | Index Type C | 10% | 13% | 12% |

TABLE 2-continued

Index Performance Knowledge Base

| Query Pattern | Query Context | Index Type | Used Frequency | Performance Benchmark | Recommendation Ratio |
|---|---|---|---|---|---|
| Query Pattern A | Context B | Index Type A | 35% | 13% | 12% |
| Query Pattern A | Context B | Index Type B | 55% | 80% | 18% |
| Query Pattern A | Context B | Index Type C | 10% | 7% | 70% |
| Query Pattern A | Context C | Index Type A | 35% | 13% | 70% |
| Query Pattern A | Context C | Index Type B | 10% | 7% | 12% |
| Query Pattern A | Context C | Index Type C | 55% | 80% | 18% |
| Query Pattern B | . . . | . . . | . . . | . . . | . . . |
| Query Pattern C | . . . | . . . | . . . | . . . | . . . |

In exemplary embodiments, the performance indicators (i.e., statistics) of the index performance knowledge base in Table 2 include one or more of the following statistics including a usage frequency, performance benchmark such as resource utilization percentage, and recommendation ratio which is a ratio of the performance benchmark to the usage frequency. The index performance knowledge base provides a map between query pattern/query context and performance indicators. In embodiments, the data from the index performance knowledge base may be stored in index database 212.

In embodiments, the performance module 223 executes the query on each index of the system catalog 214 and performs a cost comparison among the indexes. In exemplary embodiments, the performance module 223 may iterate the query pattern and perform the query for every index of the system catalog 214. The performance module 223 may use normalized queries from the query tuning module 221 for use in each index of an index type. In exemplary embodiments, the performance module 223 may also feed different sample data into the model to receive multiple performance benchmark results. For example, these performance benchmarks may include, but are not limited to, p99, p95, p90, p85, etc., determining the number of samples that are in the $99^{th}$, $95^{th}$, $90^{th}$, and $85^{th}$ percentiles, respectively, and using their results to better show performance of the query. In another example, the performance benchmark includes 1K 10K, and 100K, etc. based on the number of samples used. In other words, one thousand, ten thousand, and 100 thousand samples are generated to test the query pattern and index. These performance benchmarks may be used, as seen in the example of Table 2, to augment the index performance knowledge base and determine the best performing index and/or index types for a particular query pattern.

In embodiments, the selection module 224 selects the index to use for an incoming query querying the system catalog 214. The selection module 224 may utilize the results of the ML model and historical query performances to select an index where the query pattern and context provide the highest recommendation ratio to balance both performance and utilization rates.

Figure 3:
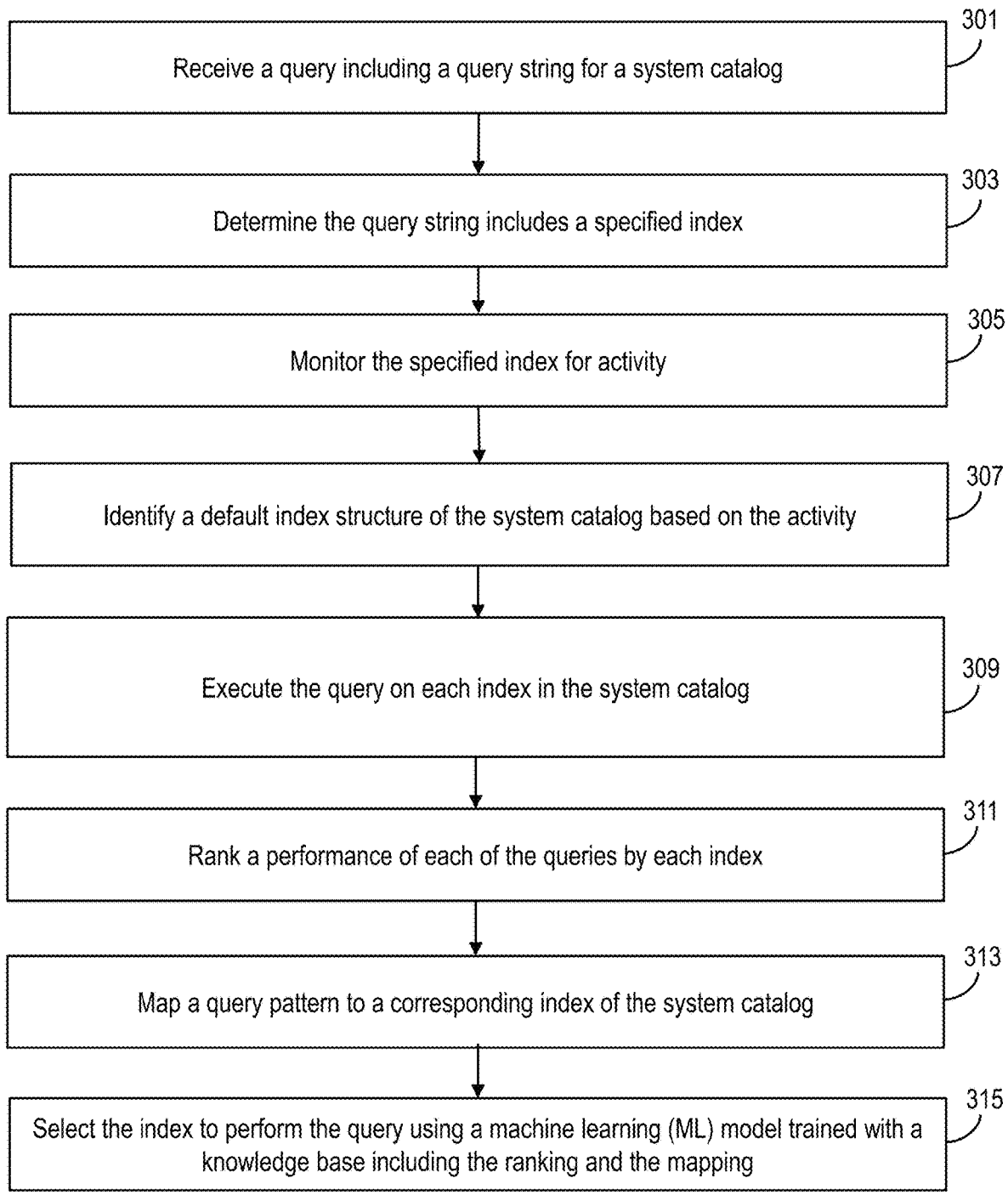
FIG. 3 shows a flowchart of an exemplary method, in accordance with aspects of the present invention.

FIG. 3 shows a flowchart of an exemplary method, in accordance with aspects of the present invention. Steps of the method may be carried out in the environment of FIG. 2 and are described with reference to elements depicted in FIG. 2.

At step 301, the hybrid query and index server 208 of FIG. 2 receives a query including a query string for a system catalog. In embodiments, and as described with respect to FIG. 2, the query is analyzed by the query tuning module 221. The analysis of the query may identify specified indexes and a query pattern based on the query string and structure of the query. At step 303, the hybrid query and index server 208 of FIG. 2 determines the query string includes a specified index.

At step 305, the hybrid query and index server 208 of FIG. 2 monitors the specified index (determined at step 303) for activity. In embodiments, and as described with respect to FIG. 2, the indexing module 223 may monitor the specified index. The index activity may provide additional context to the performance benchmarking of queries and query patterns for particular indexes. For example, the specified index may already be overutilizing system resources and may not be able to easily accept the query without further performance degradation.

At step 307, the hybrid query and index server 208 of FIG. 2 identifies a default index structure of the specified index of the system catalog 214 based on the activity from step 305. In embodiments, and as described with respect to FIG. 2, the system catalog module 220 may determine the default index structure. This default index structure may provide a baseline for the index and be used to determine the efficiency of querying the specified index with particular queries. Where the performance of the default index structure may be compared against one or more indexes with the same data utilizing a different index structure. In exemplary embodiments, the indexing module 222 may determine the default index structure based on both the activity and an analysis of the system catalog.

At step 309, the hybrid query and index server 208 of FIG. 2 executes the query on each index in the system catalog 214. In embodiments, and as described with respect to FIG. 2, the performance module 223 may execute the query iteratively on each index of the system catalog 214. The results and performance of each of these executions may be tracked and stored with the index database 212 to be tracked for later comparison. At step 311, the hybrid query and index server 208 of FIG. 2 ranks a performance of each of the executed queries from step 309 by each index. In embodiments, and as described with respect to FIG. 2, the performance module 223 may rank performance based on index utilization, a performance benchmark (including resource utilization), and/or a balance between the utilization and performance benchmark. The resource utilization may include central processing unit (CPU) utilization and/or memory utilization.

At step 313, the hybrid query and index server 208 of FIG. 2 maps a query pattern of the query to the corresponding index of the system catalog 214. In embodiments, and as described with respect to FIG. 2, the performance module 223 may map a query pattern to a corresponding index. For example, a particular query pattern with node labels may more efficiently be used to search a tree-type database index. The performance module 223 may map the query pattern to the corresponding index using a knowledge map that is part of the index performance knowledge base. The knowledge map may be built using rules to detect query patterns and relationships between index performance statistics and query patterns.

At step 315, the hybrid query and index server 208 of FIG. 2 selects the index to perform the query using an ML model trained with an index performance knowledge base including the ranking from step 311 and the mapping from step 313. The ML model may include a clustering ML model that may also be used to determine the query pattern of the query. The ML model may also determine the relationship between index performance statistics and query patterns thereby allowing the ML model to predict the best index to execute the query on (i.e., the index with the best performance for a similar or same query pattern). Based on this selection, the selected index executes the query, and the query result is returned to the device that originally submitted the request for the original query.

Figure 4A:
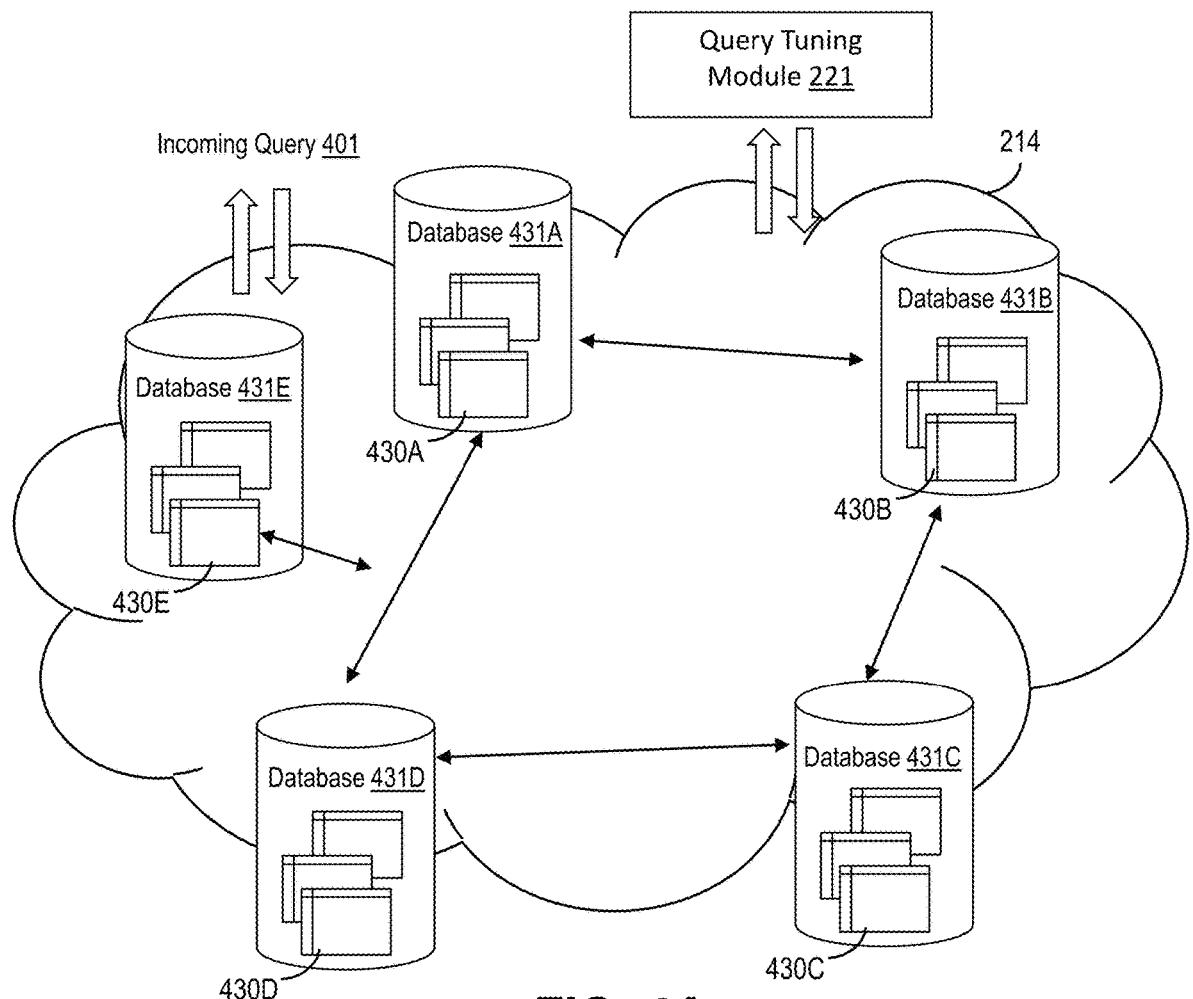
FIG. 4A shows a block diagram of an exemplary environment, in accordance with aspects of the present invention.

FIG. 4A shows a block diagram of an exemplary environment, in accordance with aspects of the present invention. Parts of this block diagram may also be carried out in the environment of FIG. 2 and are described with reference to the elements depicted in FIG. 2. As described throughout, an incoming query 401 is received by a system catalog 214 that may be distributed over a cross-hybrid cloud. The system catalog 214 may include databases 431A-431E, with each database including indexes 430A-430E, respectively. The query may be received by the system catalog 214, but is fed to the query tuning module 221 for selecting and determining which database/index in the system catalog 214 should be utilized to execute the incoming query 401. In exemplary embodiments, index 430E is a new index generated by the query tuning module 221 as a potential selection for the incoming query 401.

Figure 4B:
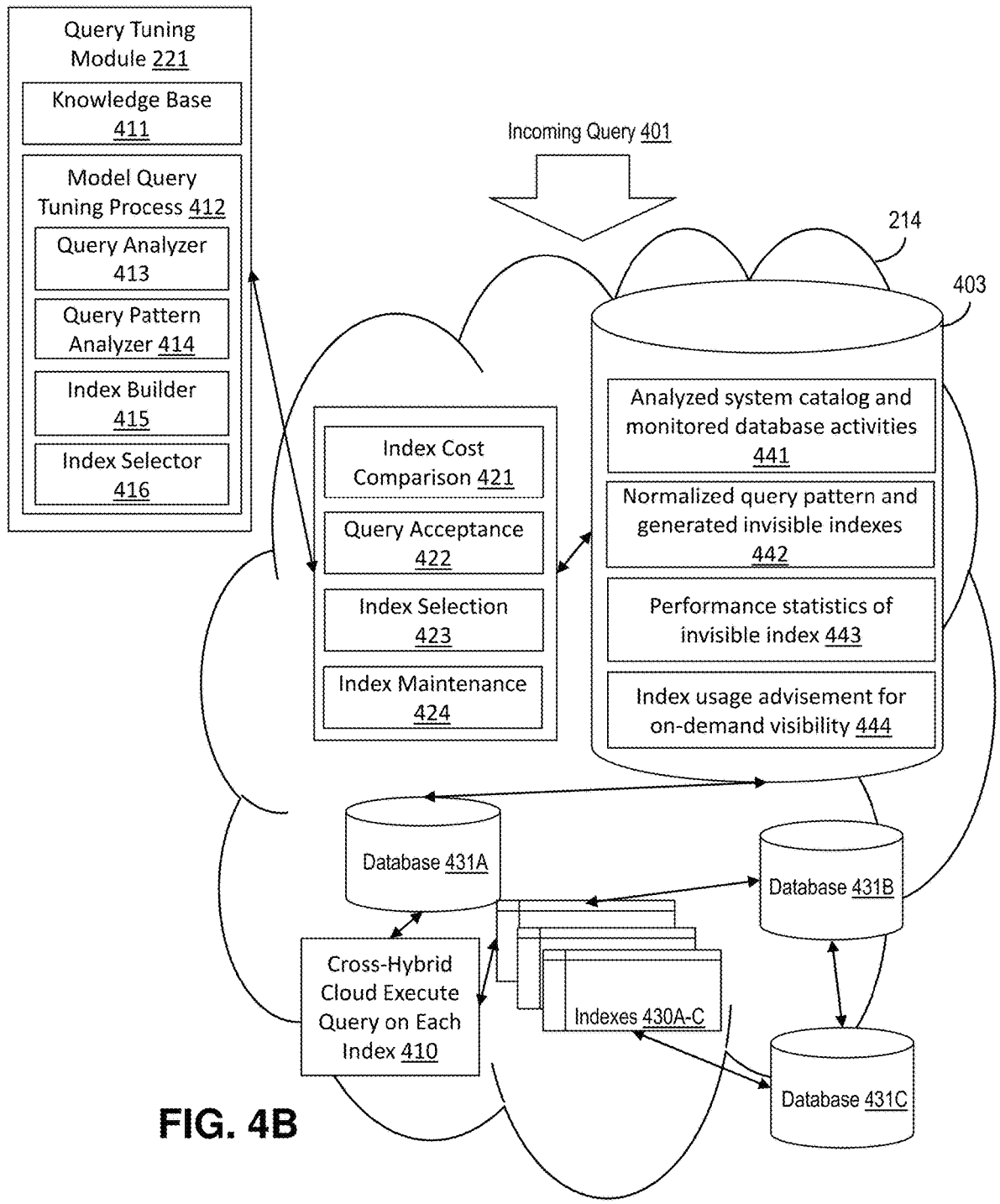
FIG. 4B shows additional details of the exemplary environment of FIG. 4A, in accordance with aspects of the present invention.

FIG. 4B shows additional details of an exemplary hybrid query and index environment, in accordance with aspects of the present invention. Parts of this block diagram may also be carried out in the environment of FIG. 2 and are described with reference to elements depicted in FIG. 2. As described throughout, an incoming query 401 is received by a system catalog 214 of a cross-hybrid cloud. The system catalog 214 may include databases 431A-431C and indexes 430A-430C. Data and/or queries may be passed among the databases 431A-431C and indexes 430A-430C. The query may be executed as indicated at 410 by each of the indexes 430A-430C in the cross-hybrid cloud to generate a performance benchmarking for the indexes 430A-430C to determine the best performing index for each query pattern type. The block diagram of FIG. 4B includes steps in the method that may be performed by various modules of the hybrid query and index server 208. The data used in these steps may be stored in database 403 which may include query database 210 and/or index database 212.

In embodiments, the query tuning module 221 may be part of hybrid query and index server 208, or a separate third-party entity as shown in FIG. 4B. The query tuning module 221 may include access to an index performance knowledge base 411. In embodiments, the index performance knowledge base 411 may be in the database 403. In exemplary embodiments, the index performance knowledge base 411 includes historical query performances, query patterns, and/or model results (i.e., whether the model predictions performance was correctly predicted). In exemplary embodiments, the model includes a clustering ML model. In exemplary embodiments, the model includes algorithms that determine the relationship between query patterns and index performance statistics.

In embodiments, the query tuning module 221 may also utilize a model query tuning process 412 that includes logic modules related to the query tuning process. These logic modules include the query analyzer 413, query pattern analyzer 414, index builder 415, and index selector 416, which are used to analyze and determine which index is best utilized in executing a received query of a query pattern type. As described herein, the query analyzer 413 may analyze the query string and query statement to identify whether an index was selected and the structure of the query. The query structure may be used to determine a pattern of the query which may also be analyzed. The query pattern analyzer 414 may determine whether the query matches known query patterns from the query database 210 of FIG. 2. If there is a match, then the model for query tuning should better predict the index at or near the highest performance to execute the query. If there is not a match, then a closest query pattern may be utilized. The closest query pattern may base the selection of the index on performance determinations for how the new query performs and/or new query utilizing an existing query pattern performs. Thus, a new query pattern may be added to the index performance knowledge base 411 (when performance is worse than predicted) or the utilized query pattern may be appropriate (when performance remains the same as expectations or better). The index builder 415 may build an invisible index that may be used to execute the query as another new potential index to execute the query. The index builder 415 determines whether a new index should be built based on similarity to the query pattern. For example, the index performance knowledge base 411 may include a historical query pattern that is similar to the received query pattern and any historical index builds that were used for the historical query pattern. The index performance knowledge base 411 may thus be utilized to determine the index that had the best performance out of all the indexes of the system catalog. In such an instance, the index builder 415 may be used to similarly build another new index with similar data adjusted based on the query and/or new query pattern. Each index, including the built index, is used to execute the query and index performance statistics are stored and compared to determine which index should be selected. In exemplary embodiments, the selected index is predicted by an index prediction model and/or ML model without performance benchmarking by matching the query pattern to a query pattern meeting the rules of the index prediction model.

In embodiments, the modules of the hybrid query and index server 208 may be used to perform operations of the modules (e.g., program instructions or other logic units) index cost comparison 421, query acceptance 422, index selection 423, and index maintenance 424. In embodiments, the index cost comparison 421 operation utilizes the execution of the query on each index by the performance module 223 to determine which index performed the best. In embodiments, the query acceptance 422 module utilizes the query tuning module 221 to determine whether a new received query has a query pattern that matches or is similar to previous historical query patterns. For example, if the query pattern matches and/or is similar to a historical query pattern, the query may utilize previous predictions under the historical query pattern and select the same index for executing the query as predicted previously by the index prediction model and/or ML model. Thus, because the query pattern matches, the index may be selected without running a performance benchmarking of the query. However, if the query pattern does not match and is not similar to a historical query pattern, the prediction model and/or ML model may be used to interpolate/predict the selected index. In this exemplary embodiment, performance benchmarks may be executed to determine which index of the system catalog has the best performance. In embodiments, the index selection 423 module utilizes the selection module 224 to select the index with the highest performance. In embodiments, the index maintenance 424 module utilizes the indexing module 223 to rebuild, add, remove, and/or change visibility of indexes of the system catalog 214. This maintenance may occur during idle times when there are no incoming queries. In exemplary embodiments, the index maintenance 424 module may include the addition of newly built indexes or removal of indexes that are not utilized. In exemplary embodiments, the index maintenance 424 module may include changing visibility of indexes built by the index builder 415 module. This changing visibility may be based on utilization by the index selector 416 module. For example, some built indexes may remain invisible until demand for the index is created, such as when a new query pattern may perform best with the invisible index.

In embodiments, the database 403 may include data to be maintained and changed as needed based on new indexes and newly identified query patterns. In embodiments, the database 403 may include one or more of data resulting from an analyzed system catalog and monitored database activities 441, normalized query pattern and information about generated invisible indexes 442, index performance statistics of invisible indexes 443 as run in the background of a system catalog, and index usage advisement for on-demand visibility 444. In exemplary embodiments, the analyzed system catalog and monitored database activities 441 may be utilized to identify index structure. The index structure may then determine index performance statistics that should be collected to generate a performance benchmark when executing the query. In exemplary embodiments, the normalized query pattern and information about generated invisible indexes 442 may provide a query pattern that may be used/converted for use on any index type, and may be compared to match a historical query pattern (that is also normalized). In exemplary embodiments, the normalized query pattern may also be used to determine whether an invisible index should be generated. In exemplary embodiments, the index performance statistics of the invisible index 443 may be collected and compared against the index performance statistics of each index of the system catalog 214. The highest performing index is then selected for the query pattern. In exemplary embodiments, the index usage advisement for on-demand visibility 444 determines whether a built invisible index should be selected due to having the highest performance. For example, if the invisible index is selected to have the highest performance, then demand for the invisible index is created and the index should now be changed from invisible to visible.

Figure 5A:
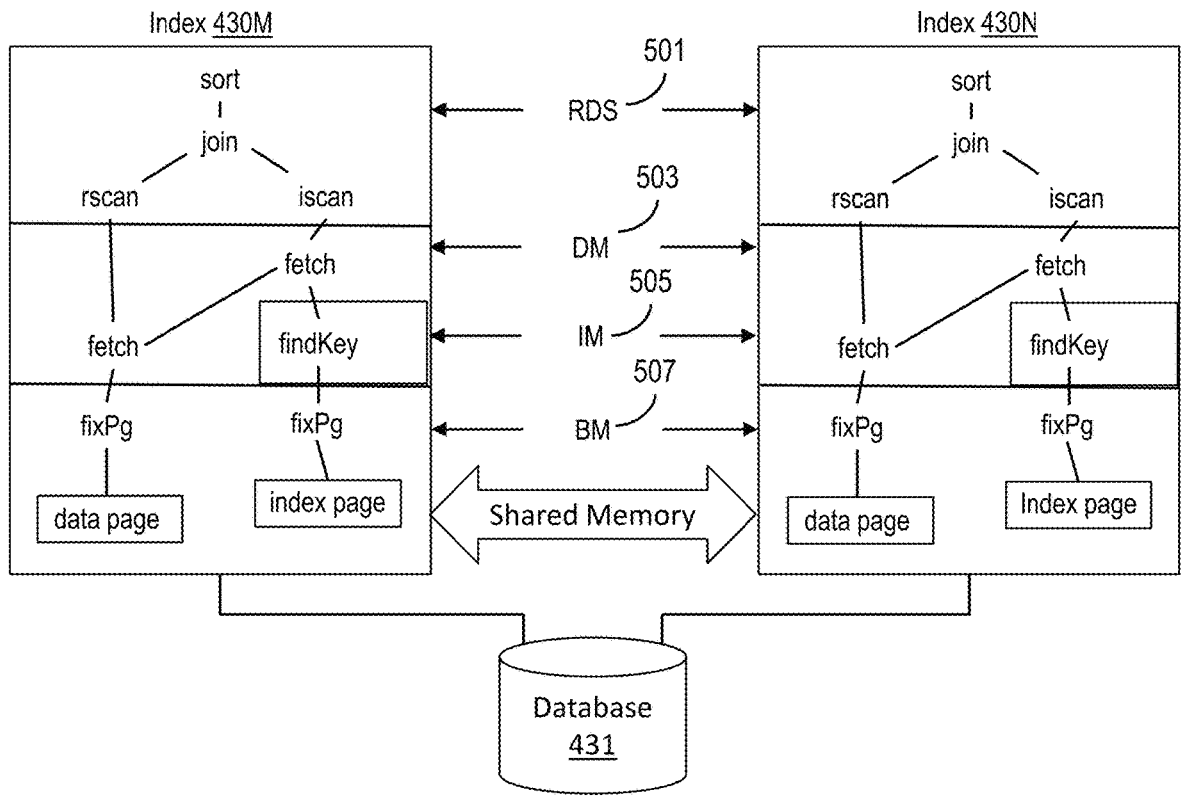
FIG. 5A shows a block diagram of exemplary database activities collection methods, in accordance with aspects of the present invention.

FIG. 5A shows a block diagram of exemplary database activities collection methods, in accordance with aspects of the present invention. The database 431 with indexes 430M and 430N may be monitored, at step 305 of FIG. 3, using one or more database management systems such as: relational database services (RDS) 501, database management (DM) 503, in-memory (IM) database management 505, and bare metal (BM) database management 507 systems. Each of these systems may have different access to different actions on the database which may include those shown in FIG. 5A as well as many others. The shown database actions include sort, join, rscan, iscan, fetch, findKey, and fixPg actions, as well as the actions related to the data itself (i.e., the data page and index page). This monitoring of the specified index for activity may be used to determine the default index structure of the specified index.

Figure 5B:
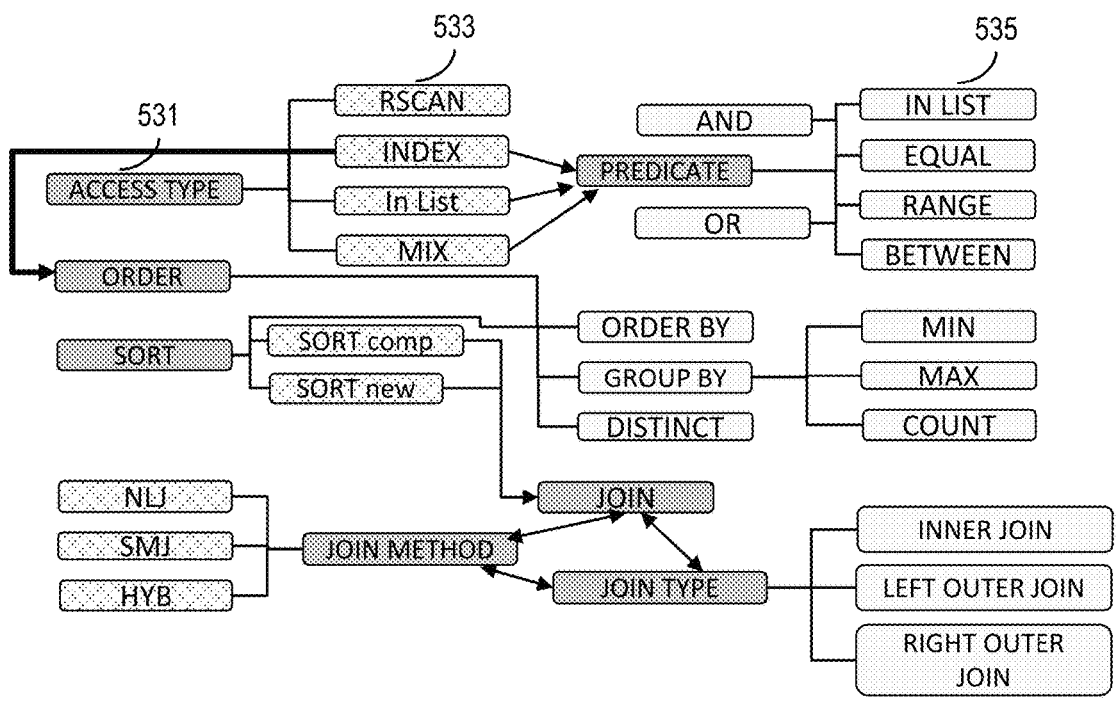
FIG. 5B shows a block diagram of an exemplary query knowledge map, in accordance with aspects of the present invention.

FIG. 5B shows a block diagram of an exemplary query knowledge map, in accordance with aspects of the present invention. The query knowledge map may be utilized to map the query to a query pattern from step 313 of FIG. 3 by determining the relationships between each statement in the query, and query statements in the query knowledge map. As shown, different query statements used in the incoming query may be used with different relationships to one another. Each of these query statements may vary in the type of statement level and/or relationship to the other query statements. For example, the "Access Type" statements 531 (including "order," "sort," "join," "predicate," "join method," "join type," etc.) are generally at a lower statement level (depicted with a medium shade of gray) than the "RSCAN" statements 533 (including "Index," "In List," "Mix," "Sort comp," "Sort new," "NLJ," "SMJ," "HYB," etc.—depicted with the dotted patterning). These "RSCAN" statements 533 are further at a higher statement level than the "AND," "OR," and "IN LIST" statements 535 (depicted with the lightest shade of gray). In embodiments, some query statements may provide access to data in the database using different search statements, sorting statements or joining statements. Each of these query statements may be related to a particular type of searching, sorting, or joining. For example, an incoming query including AND and IN LIST statements may be associated with In List type access/searches. The use of these statements may indicate particular indexes of the system catalog will execute the query more efficiently and effectively, thus one or more of these indexes may be selected based on this knowledge map to execute received queries including AND and IN LIST statements.

Figure 6A:
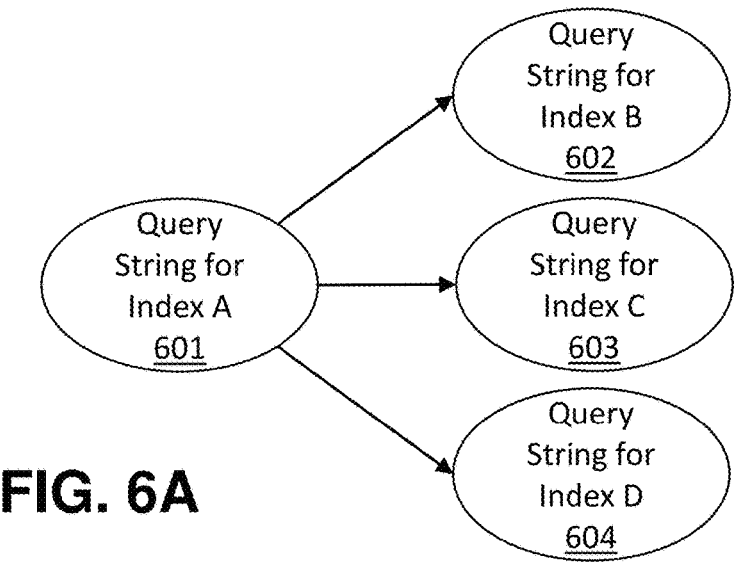
FIG. 6A shows a flowchart of an exemplary method of generating a query string for different index types, in accordance with aspects of the present invention.

FIG. 6A shows a flowchart of an exemplary method of generating a query string (i.e., the method of utilizing the same query with different index types by normalizing the query using a normalized query pattern) for different index types, in accordance with aspects of the present invention. In embodiments, the query string for index A 601 may be normalized and converted to query strings for index B 602, index C 603, and index D 604. In exemplary embodiments, the normalization process (such as at 442 of FIG. 4B) includes analyzing the query string for index A for the query structure and generating a query pattern from the query string. The query pattern is then normalized for use by different indexes and may more easily be converted for use by the different indexes. The normalized query pattern is used in executing the query on each index in the system catalog from step 309 of FIG. 3. Without normalizing the query, a received query would not be executable on indexes of a different type.

Figure 6B:
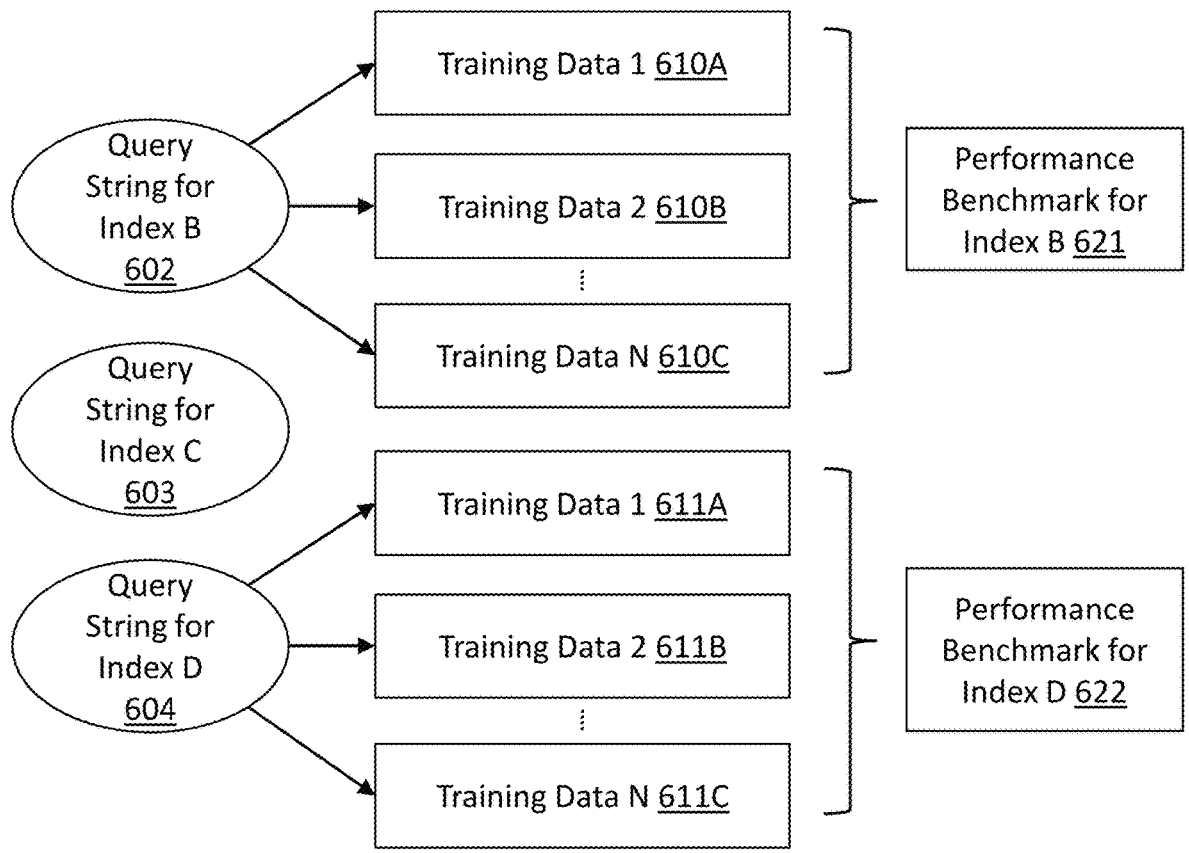
FIG. 6B shows a flowchart of an exemplary method of using a query string to generate training data for an ML model and perform benchmarks for the index type, in accordance with aspects of the present invention.

FIG. 6B shows a flowchart of an exemplary method of using a query string to generate training data for an ML model and perform benchmarks for the index type, in accordance with aspects of the present invention. Once the query is normalized for different index types, from FIG. 6A, the query may be executed on different indexes and the performance on each index may be tracked for performance benchmarking. In embodiments, the ranking of the performance of each of the queries by each index from step 311 of FIG. 3 are compared against one another. Additionally, the performance statistics of these indexes may be used to determine whether a future query is performing better or worse than in the past and a new query pattern may need to be utilized. In embodiments, the query string for index B 602 is executed by each index of the same type (B). The index performance statistics of these indexes are tracked and stored as training data 1 610A, training data 2 610B, and training data N 610C. Then based on this training data, a performance benchmark for index B 621 may be determined. In exemplary embodiments, some of this training data may also include virtual samples that may be used to generate better benchmarks. The query string used for particular index types may all be used to generate training data in the same manner. For example, the query string for index D 604 generates training data 1 611A, training data 2 611B, and training data N 611C for use in performance benchmarking for index D 622. However, query string for index C 603 may lack indexes of type C in the system catalog. Thus, no performance benchmark may be made for the query string for index C 603.

Figure 6C:
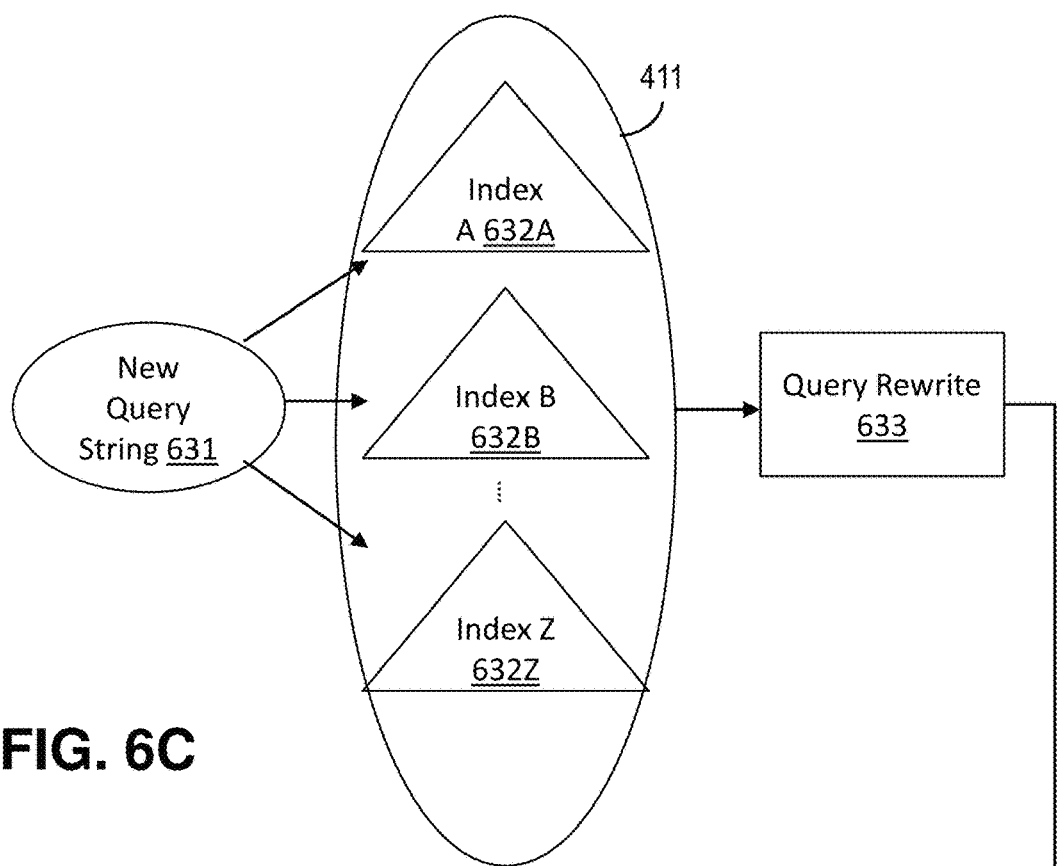
FIG. 6C shows a flowchart of another exemplary method of determining visibility of a built index, in accordance with aspects of the present invention.
Figure 6C:
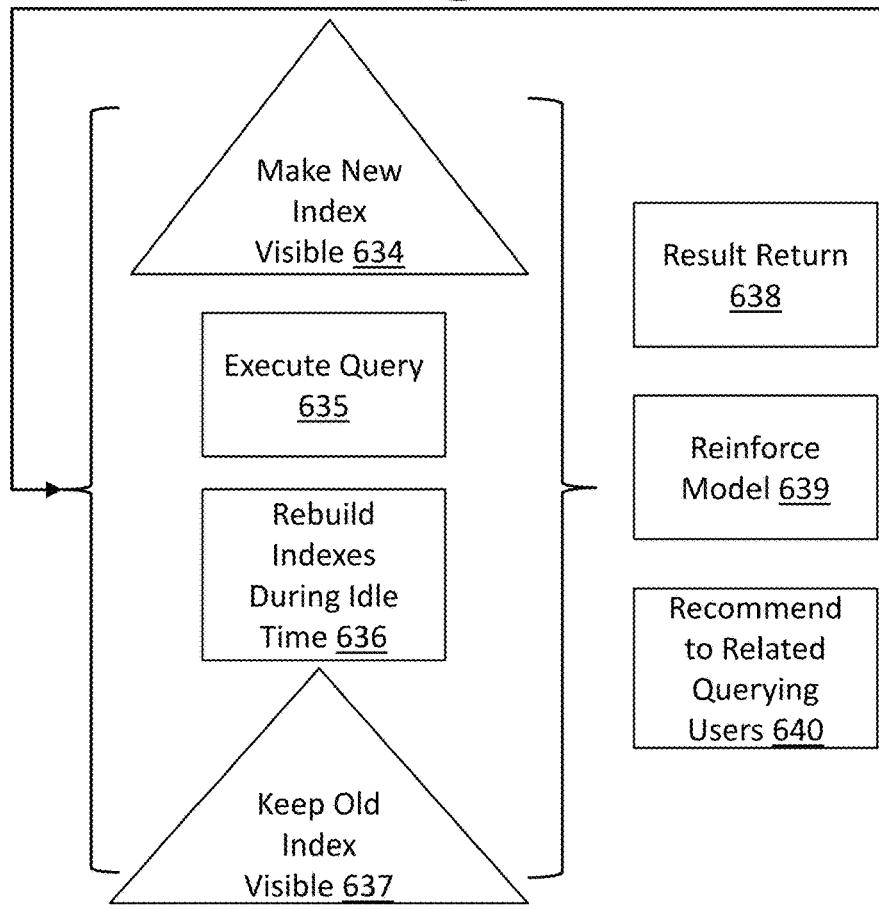

FIG. 6C shows a flowchart of another exemplary method of determining visibility of a built index, in accordance with aspects of the present invention. The flowchart of FIG. 6C includes examples from steps 301-311 of FIG. 3. In embodiments, the new query string 631 is accepted by the query tuning module 221 of FIG. 2 and checked in index performance knowledge base 411. Index performance knowledge base 411 is used to compare a new query pattern of the new query string 631 to historical query patterns for different indexes 632A-632Z. Should an historical query pattern match the new query pattern, then the corresponding index is selected and there is no need to rewrite the query. Additionally, if the new query string 631 specifies an appropriate index, that index may be selected. However, should no match be found, the new query string 631 may be rewritten at 633 with a normalized query pattern for use by any of the indexes 632A-632Z of the index performance knowledge base 411 of FIG. 4, and executed on each index to determine index performance statistics for each index. Further, an invisible index may be built to provide another potential index that may perform better than the existing/default indexes. To do this, the query is executed at 635 iteratively on each index and index performance statistics for each index are collected. Based on the index performance statistics, should the built invisible index be determined to have the highest performance, demand for the built index is created and the built index is made visible at 634. Should an existing index be the highest performing index, the existing index is kept visible at 637. Additionally, based on whether the indexes have changed the indexes of the system catalog may be rebuilt during idle times at 636 (e.g., when no query is received by the system catalog). Once the index is selected, a result of the query is returned at 638 and the utilized index and query pattern are tracked to reinforce the model at 639 (whether a rule-based model or clustering ML model). Additionally, the built index, based on the associated query pattern may be recommended to related querying users at 640.

In embodiments, a service provider could offer to perform the processes described herein. In this case, the service provider can create, maintain, deploy, support, etc., the computer infrastructure that performs the process steps of the invention for one or more customers. These customers may be, for example, any business that uses applications that heap memory management during runtime of the application. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer 101 of FIG. 1, can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving, by a processor set, a query including a query string for a system catalog;
identifying, by the processor set, a default index structure of the system catalog;
executing, by the processor set, the query based on the default index structure of each index in the system catalog;
ranking, by the processor set, a performance of each execution of the query by each index;
mapping, by the processor set, a query pattern to a corresponding index of the system catalog;
selecting, by the processor set, the index to perform the query using a machine learning (ML) model trained with a knowledge base that includes the ranking and the mapping;
executing, by the processor set, the query on the selected index;
in response to executing the query on the selected index, returning, by the processor set, a result of the query; and
receiving, by the processor set, a new query;
analyzing, by the processor set, the new query to determine a new query pattern; and
building, by, the processor set, a new invisible index based on the determined new query pattern and determining whether the new invisible index performs better than the system catalog.

2. The method of claim 1, further comprising:
determining the query string includes a specified index; and
monitoring the specified index for activity.

3. The method of claim 1, further comprising:
normalizing a plurality of query statements of the query string to the query pattern, wherein the new invisible index is further based on the query pattern;
determining that the new invisible index has a highest performance for the system catalog; and
changing the new invisible index to be a visible index in response to determining that the new invisible index has the highest performance for the system catalog.

4. The method of claim 3, wherein the determining that the new invisible index has the highest performance for the system catalog further comprises performance benchmarking of the new invisible index and each index in the system catalog and comparing performances of the new invisible index for the new query pattern and each index for each query pattern in the system catalog.

5. The method of claim 1, further comprising:
determining the query pattern specified by the query string based on a query structure and statistics of the knowledge base;
identifying a target index based on the query string;
converting the query pattern to work with a plurality of index types; and
determining the performance of the query pattern for each of the index types.

6. The method of claim 5, further comprising training of the ML model by
detecting a relationship between the statistics and the query pattern.

7. The method of claim 6, wherein the ML model is a clustering ML model.

8. The method of claim 1, wherein the knowledge base includes historical query performance.

9. The method of claim 1, wherein the statistics include a usage frequency, a performance benchmark, and a recommended ratio of the query pattern.

10. The method of claim 1, further comprising:
matching the query pattern with another query pattern of another received query; and
selecting, based on the matched query pattern, another index of the system catalog to execute the another received query.

11. A computer program product comprising one or more computer readable storage media having program instructions collectively stored on the one or more computer readable storage media, the program instructions executable to:
receive a query including a query string for a system catalog;
determine the query string includes a specified index;
monitor the specified index for activity;
identify a default index structure of the system catalog based on the activity;
execute the query based on the default index structure of each index in the system catalog;
rank a performance of each execution of the query by each index;
map a query pattern to a corresponding index of the system catalog;
select the index to perform the query using a machine learning (ML) model trained with a knowledge base that includes the ranking and the mapping;
execute the query on the selected index;
in response to the execution of the query on the selected index, return a result of the query;
receive a new query;
analyze the new query to determine a new query pattern; and
build a new invisible index based on the determined new query pattern and determining whether the new invisible index performs better than the system catalog.

12. The computer program product of claim 11, further comprising the program instructions to:
normalize a plurality of query statements of the query string to a query pattern, wherein the new invisible index is further based on the query pattern;
determine that the new invisible index has a highest performance for the system catalog; and
change the new invisible index to be a visible index in response to determining that the new invisible index has the highest performance for the system catalog.

13. The computer program product of claim 12, wherein the determining that the new invisible index has the highest performance for the system catalog further comprises performance benchmarking of the new invisible index and each index in the system catalog and comparing performances of the new invisible index for the new query pattern and each index for each query pattern in the system catalog.

14. The computer program product of claim 11, further comprising the program instructions to:
determine the query pattern specified by the query string based on a query structure and statistics of the knowledge base;
identify a target index based on the query string;
convert the query pattern to work with a plurality of index types; and
determine the performance of the query pattern for each of the index types.

15. The computer program product of claim 14, further comprising the program instructions to:
detect a relationship between the statistics and the query pattern.

16. The computer program product of claim 15, wherein the ML model is a clustering ML model.

17. The computer program product of claim 11, wherein the knowledge base includes historical query performance.

18. The computer program product of claim 11, wherein the statistics include a usage frequency, a performance benchmark, and a recommended ratio of the query pattern.

19. A system comprising:
a processor set, one or more computer readable storage media, and program instructions collectively stored on the one or more computer readable storage media, the program instructions executable to:
receive a query including a query string for a system catalog;
determine the query string includes a specified index;
monitor the specified index for activity;
identify a default index structure of the system catalog based on the activity;
execute the query on each index in the system catalog;
rank a performance of each execution of the query by each index;
map a query pattern to a corresponding index of the system catalog;
select the index to perform the query using a machine learning (ML) model trained with a knowledge base that includes the ranking and the mapping;
execute the query on the selected index;
in response to the execution of the query on the selected index, return a result of the query;
receive a new query;
analyze the new query to determine a new query pattern; and
build a new invisible index based on the determined new query pattern and determining whether the new invisible index performs better than the system catalog.

20. The system of claim 19, further comprising the program instructions to:
determine the query pattern specified by the query string based on a query structure and statistics of the knowledge base;
identify a target index based on the query string;
convert the query pattern to work with a plurality of index types;
determine the performance of the query pattern for each of the index types;

determine that the new invisible index has a highest performance for the system catalog; and change the new invisible index to be a visible index in response to determining that the new invisible index has the highest performance for the system catalog, wherein the determining that the new invisible index has the highest performance for the system catalog further comprises performance benchmarking of the new invisible index and each index in the system catalog and comparing performances of the new invisible index for the new query pattern and each index for each query pattern in the system catalog.

\* \* \* \* \*